United States Patent Office 3,647,870
Patented Mar. 7, 1972

3,647,870
PROCESS FOR THE PRODUCTION OF META BENZENE DISULFONYL CHLORIDES
Shigeto Suzuki, San Francisco, Calif., assignor to Chevron Research Company, San Francisco, Calif.
No Drawing. Filed May 1, 1968, Ser. No. 725,952
Int. Cl. C07c 143/70
U.S. Cl. 260—543 R
9 Claims

ABSTRACT OF THE DISCLOSURE

Meta benzene disulfonyl chlorides are produced by heating a mixture of a meta benzene disulfonic acid and carbon tetrachloride in the liquid phase. The reaction is catalyzed by strong mineral acids at a temperature above 130° C.

---

This invention relates to a process for the production of meta benzene disulfonyl chlorides and to substituted meta benzene disulfonyl chlorides.

The subject disulfonyl chlorides are useful for the production of linear polymers as by their reaction with a diamine, a diol and the like. They are also useful intermediates for the production of dyes, esters, sulfones and other useful organic products.

It is known to produce benzene sulfonyl chlorides by the reaction of benzene with chlorosulfonic acid; it is also known to produce these chlorides by the reaction by benzene with carbon tetrachloride in the presence of sulfuric acid (cf. German Pat. No. 757,503 of Apr. 10, 1952). It is also known to react a sulfonate salt of the formula $RSO_3Na$ with benzotrichloride (cf. U.S. Pat. No. 2,016,784 of Oct. 8, 1935). In the former the reaction is unsatisfactory because resinous by-products are formed. In the latter, the insolubility of the disodium salts in inert organic solvents as well as the relatively costly benzotrichloride renders the process unsatisfactory in general for the production of disulfonyl chlorides.

It has now been found that benzene disulfonyl chlorides are produced by the reaction of carbon tetrachloride with a sulfonic acid of the formula $XC_6H_3(SO_3H)_2$ in which X is hydrogen or an inert substituent provided that (1) the orientation of the sulfonic acid groups is of the meta relationship; (2) the temperature is above about 130° C.; (3) the reaction is effected at a pressure sufficient to maintain carbon tetrachloride in the liquid phase; (4) the reaction is catalyzed by a strong mineral acid; and (5) at least a substantially stoichiometric amount of the tetrahalide relative to the sulfonic acid is used in the reaction. The reaction should be carried out at a temperature which is below the thermal decomposition temperature of the desired disulfonyl chloride. Under the foregoing conditions substantially quantitative yields, i.e., in general above about 90 mol percent, of the disulfonyl chlorides are readily achieved. A similar yield is obtainable where the disulfonic acid contains a single inert substituent group. Inert groups include phenyl, lower halides, i.e., halogens of atomic number less than 36, and alkyl groups containing less than 21 carbon atoms. Surprisingly, in general little or no polymeric by-product resins are produced concurrently in the course of the subject reaction.

The reaction of carbon tetrachloride with a meta benzenesulfonic acid appears to be as follows (1) $XC_6H_3(SO_3H)_2 + 2CCl_4H^+ \longrightarrow$
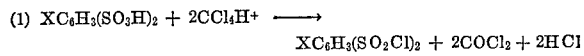
$XC_6H_3(SO_2Cl)_2 + 2COCl_2 + 2HCl$ For a satisfactory reaction, the temperature must be above about 130° C. On the other hand, depending upon the particular disulfonyl chloride being produced, decomposition occurs in the range from about 220° C. to 325° C. Therefore, the reaction should be carried out below the decomposition temperature. The range from about 140° C. to 200° C. is preferred.

The reaction time which should be used in the subject process varies depending upon the temperature and disulfonic acid feed used. In general a satisfactory time is in the range from a few minutes to a few hours. At the upper end of the satisfactory temperature range a reaction time of a few minutes is satisfactory and desirable; on the other hand, at about 130° C. a reaction time of from about 1 to 3 hours is necessary in order to obtain a reasonable conversion and yield.

For a satisfactory yield of the desired disulfonyl chloride and in order to avoid a concurrent side reaction and the production of undesirable by-products, a substantially stoichiometric amount, i.e., of the order of at least 1.8 mols of carbon tetrachloride per mol of disulfonic acid, must be present. Best results are obtained in general when the ratio is about 2.0 to 2.5. Larger relative amounts of the tetrahalide are satisfactory except that at an excessive ratio, i.e., at about 10 to 1, respectively, and higher, the relative efficiency of the process becomes impracticable.

Mineral acids suitable for use as catalysts herein include sulfuric, phosphoric, polyphosphoric, and the like, and mixtures of these strong inorganic acids. Sulfuric acid is preferred.

As little as 0.001 mol of the acid per mol of the disulfonic acid feed is sufficient for effective catalysis. Better results are obtained when larger relative amounts are used, i.e., of the order of about 0.01 to 0.1 mol, respectively. The use of an excessive amount of acid is undesirable for a number of reasons including cost and relative ease of purification of the product. Depending upon the disulfonyl chloride being produced and the acid catalyst being employed, the acid to feed ratio should not exceed about 0.5–1 to 1, respectively.

In general the employment of an inert diluent as solvent is not particularly advantageous. Where the action of such agents is desired, the use of an excess of carbon tetrachloride is usually a better expedient. The subject sulfonic acids have little or no solubility in carbon tetrachloride and in most inert solvents. Nevertheless the reaction proceeds satisfactorily despite the heterogeneous reaction system, provided that the pressure is sufficient to maintain carbon tetrachloride in the liquid phase. Best results are achieved in terms of efficient reaction times when the mixture is well stirred.

Representative benzene disulfonic acids useful in the present process include the following acids: 1,3-benzene disulfonic, 4-phenyl-1,3-benzene disulfonic, 6-methyl-1,3-benzene disulfonic, 5-(4-pentyl)-1,3-benzene disulfonic, 5-(n-eicosyl)-1,3-benzene disulfonic, 5-fluoro-1,3-benzene disulfonic, 4 - (3 - methyl - 6 - pentadecyl)-1,3-benzene disulfonic, 5-phenyl-1,3-benzene disulfonic, 5-methyl-1,3-benzene disulfonic, 4-methyl-1,3-benzene disulfonic, 4-chloro-1,3-benzene disulfonic, 5-chloro-1,3-benzene disulfonic, 5-(5 - isopropyl-1-heptadecyl) - 1,3 - benzene disulfonic, 2-methyl-1,3-benzene disulfonic, 5-bromo-2-chloro-1,3-benzene disulfonic, 5-bromo-1,3-benzene disulfonic and the like acids. 1,3-benzene disulfonic acid is a preferred feed.

The following examples are included to further illustrate the invention.

EXAMPLE 1

1,3-benzene disulfonic acid, carbon tetrachloride and sulfuric acid in a mol ratio of 1:10:0.06, respectively, were charged to a glass lined pressure reactor set for venting at 200 p.s.i.g. The reactor and contents was heated at a temperature of 170° C. for a period of 2 hours. The conversion was complete and the in-hand recovery of the disulfonyl chloride was 92.4 mol percent. The actual yield was estimated as being substantially quantitative.

EXAMPLE 2

Example 1 was repeated except that the temperature was maintained in the range 130° C. to 155° C. After an eight-hour reaction period, the yield of disulfonyl chloride was 91 mol percent.

EXAMPLE 3

Example 1 was repeated except that the ratio of the reactants was 1:1:0, respectively. The yield of the disulfonyl chloride was only 3 mol percent.

EXAMPLE 4

Example 1 was repeated except that the mol ratio of the reactants was 1:2.5:0.01, respectively. The yield of disulfonyl chloride was 94 mol percent.

EXAMPLES 5-6

Under conditions essentially as in Example 1 except that non-meta oriented sulfonic acids were used as noted below in Table I with variations as follows:

| Example No. | Temp., ° C. | Time, hrs. |
|---|---|---|
| 5 | 170 | 2 |
| 6 | 180 | 3 |

TABLE I

| Example No. | Sulfonic acid | Sulfonyl group orientation | Yield mol, percent |
|---|---|---|---|
| 1 | 1,3-benzene disulfonic | Meta | 92-100 |
| 5 | Benzene sulfonic | Non-meta | ~0 |
| 6 | 1,5-naphthalene disulfonic | do | <1 |

The above examples demonstrate that meta oriented benzene disulfonic acids are efficiently converted to the corresponding disulfonyl chlorides in the instant process while non-meta oriented sulfonic acids are not. Substituted 1,3-benzene disulfonic acids in which the substituent is inert yield the corresponding disulfonyl chlorides. Similarly, polyphosphoric and phosphoric acids are effective strong mineral acid catalysts for the present process.

It will be readily appreciated from the foregoing disclosure and examples that variations can be made by those skilled in the art without departing from the scope and spirit of the appended claims.

I claim:

1. The process for the production of a sulfonyl chloride of the formula $XC_6H_3(SO_2Cl)_2$ by reacting carbon tetrachloride with an acid of the formula $XC_6H_3(SO_3H)_2$ wherein X is selected from the group consisting of phenyl, halogen having an atomic number less than 36, alkyl groups containing less than 21 carbon atoms and hydrogen, and wherein said sulfonic acid and sulfonyl chloride groups are of the 1,3-orientation, which consists essentially of heating a mixture of the reactants and a mineral acid catalyst at a temperature above about 130° C. and below the thermal decomposition temperature of the resulting disulfonyl chloride, said heating being for a period in the range from a few minutes to about three hours, and at a pressure sufficient to maintain carbon tetrachloride in the liquid phase, said mixture containing for each mol of the sulfonic acid an amount of carbon tetrachloride in the range 1.8 to 10 mols and an amount of the catalyst in the range 0.001 to 1 mol; said catalyst being selected from the group consisting of sulfuric, phosphoric, and polyphosphoric acids and mixtures of said mineral acids.

2. The process as in claim 1 wherein said reactants and catalyst are dissolved in a solvent selected from the group consisting of inert organic solvents.

3. The process as in claim 1 wherein said mixture contains for each mol of the sulfonic acid an amount of carbon tetrachloride in the range from about 2.0 to 2.5 mols and of catalyst in the range from about 0.01 to 0.1 mol; and wherein said temperature is in the range from 140° C. to 200° C.

4. The process as in claim 3 wherein said acid catalyst is sulfuric acid.

5. The process as in claim 3 wherein X of the formula is hydrogen.

6. The process as in claim 3 wherein X of the formula is methyl.

7. The process for the production of 1,3-benzene disulfonyl chloride, which consists essentially of reacting carbon tetrachloride with 1,3-benzene disulfonic acid by heating a mixture of said sulfonic acid, carbon tetrachloride and sulfuric acid at a temperature of about 170° C. and at a pressure sufficient to maintain carbon tetrachloride in the liquid phase for a period of about two hours, wherein said reactants, the sulfonic acid and carbon tetrachloride, and sulfuric acid are present in the mixture at a mol ratio of about 1:2.5:0.01 respectively.

8. The process for the production of 1,3-benzene disulfonyl chloride by reacting carbon tetrachloride with 1,3-benzene disulfonic acid, which consists essentially of heating a mixture of the reactants and a mineral acid catalyst at a temperature above 130° C. and below the thermal decomposition temperature of 1,3-benzene disulfonyl chloride, said heating being for a period in the range from a few minutes to about three hours, and at a pressure sufficient to maintain carbon tetrachloride in the liquid phase, said mixture containing for each mol of the sulfonic acid an amount of carbon tetrachloride in the range 1.8 to 10 mols and an amount of the catalyst in the range 0.001 to 1 mol.

9. The process as in claim 8 wherein said acid catalyst is sulfuric acid.

References Cited

UNITED STATES PATENTS

| 2,946,815 | 7/1960 | Hamor | 260—470 |
| 2,806,061 | 9/1957 | Wygant | 260—544 |

FOREIGN PATENTS

| 581,615 | 8/1959 | Canada. |
| 135,482 | 5/1960 | U.S.S.R. |

LORRAINE A. WEINBERGER, Primary Examiner

E. J. GLEIMAN, Assistant Examiner